United States Patent Office 3,380,977
Patented Apr. 30, 1968

3,380,977
PREPARATION OF FLUORINATED POLYMERS
George F. Helfrich, Baton Rouge, and Earl J. Rothermel, Jr., Baker, La., assignors to The Dow Chemical Company, Midland, Mich., a corporation of Delaware
No Drawing. Filed July 30, 1964, Ser. No. 386,377
6 Claims. (Cl. 260—87.5)

This invention relates to a process for making fluorinated polymers. More particularly, the invention relates to a process for making fluorinated polymers which comprises effecting reaction between a mixture of ingredients comprising one or more polymerizable fluorinated ethylenes and a catalytic mixture of titanium tetrachloride, triethyl aluminum and tetrahydrofuran.

The process forming the object of the invention consists in contacting one or more polymerizable ethylene compounds containing fluorine, or fluorine and another halogen or mixtures of one or more of such fluorinated ethylenes, with one or more copolymerizable ethylenically unsaturated monomers, in the absence of solvents or diluents at a temperature between about 25° C. and 60° C., while autogeneous pressure, with a catalytic mixture of (1) titanium tetrachloride, (2) triethyl aluminum, and (3) tetrahydrofuran; wherein the metal constituent of (1) is present in amounts of at least about 1 p.p.m. and preferably less than about 1000 p.p.m. and more particularly between about 200 to 300 p.p.m., based on the weight of the monomer; wherein (2) is present in amounts between about 1 and 10 moles per mole of (1); wherein (3) is present in amounts between about 1 and 20 moles per mole of (1); and wherein such mixture is formed by admixture of (2) and (3) followed by the addition of (1).

As the ethylene compound containing fluorine may be mentioned, for example, chlorotrifluoroethylene, vinyl fluoride, vinylidene fluoride, trifluoroethylene, tetrafluoroethylene, etc.

Copolymerizable ethylenically unsaturated monomers which may be used if desired include: symmetrical dichloroethylene, unsymmetrical dichloroethylene, vinyl chloride, acrylonitrile and the lower acrylates and methacrylates, among many others.

It is to be emphasized that the optimum polymerization conditions may vary somewhat within the prescribed limits of the present invention, depending upon the types and amounts of monomers used, e.g. it has been found that vinyl fluoride or chlorotrifluoroethylene polymers prepared as described herein often require a higher ratio of tetrahydrofuran to titanium tetrachloride for obtainment of optimum polymerization rate and yield, as compared to polymers prepared from vinylidene fluoride. Further, it has been found that polymers consisting essentially of polymerized vinyl fluoride or chlorotrifluoroethylene or mixtures thereof, often require a somewhat lower ratio of triethyl aluminum to titanium tetrachloride as compared to those polymers consisting essentially of vinylidene fluoride. Other adjustments in those polymerization conditions as set forth by the present invention, such as polymerization temperature, will become apparent to those skilled in the art.

The process of the present invention provides a convenient and economical method for the preparation of high molecular weight fluorine containing polymers which may be advantageously utilized in applications requiring good chemical and thermal stability, as well as for those applications additionally requiring excellent mechanical and electrical properties. Thus, such polymers are particularly well adapted for use as gasketing materials where high heat resistance and chemical resistance are desired, and for insulation purposes either by extrusion over electrical conductors or by the wrapping of tapes around electrical conductors. Many other uses and advantages of these materials will be known to those skilled in the art.

The following examples, wherein all parts and percentages are to be taken by weight, illustrate the present invention but are not to be construed as limiting its scope.

Example 1

In each of a series of experiments 100 parts by weight of dry, inhibitor-free vinyl fluoride monomer were individually sealed under nitrogen in a dry glass bottle containing a catalyst mixture composed of titanium tetrachloride in amount sufficient to provide from about 200 to 300 p.p.m. titanium based on the weight of the monomer; triethyl aluminum in amount sufficient to provide from about 1 to 5 moles of triethyl aluminum per mole of titanium tetrachloride, and tetrahydrofuran in amount sufficient to provide from about 10 to 20 moles of tetrahydrofuran per mole of triethyl aluminum; such catalyst mixture being prepared by first admixing the triethyl aluminum and tetrahydrofuran for a period of about thirty minutes at a temperature of about 25° C. in the reaction bottle followed by the addition of the titanium tetrachloride. The bottles containing the mixtures were then individually capped and shaken to insure uniform mixing, and the contents subsequently reacted for a period of about 6 hours at 40° C. in a constant temperature bath. At the end of the reaction period, each bottle was opened, allowed to cool and the polymeric material washed with methanol containing 3 weight percent of hydrochloric acid, and then dried. The individually recovered polymeric products were each fine white powders having a melting point of from about 120° C. to 140° C. These polymers did not discolor or otherwise decompose when subjected to temperatures up to about 150° C. and were each capable of being formed into tough film materials having excellent clarity.

Example 2

In each of a series of experiments 100 parts by weight of dry, inhibitor-free chlorotrifluoroethylene monomer were polymerized as described in Example 1, utilizing a polymerization temperature of about 55° C. and a reaction time of about 17 hours. The recovered polymeric products were each fine white powders having a melting point of from about 140° C. to 150° C. These polymeric materials did not discolor or otherwise decompose when subjected to temperatures of up to about 270° C. and were capable of being formed into film materials having excellent clarity.

Example 3

In each of a series of experiments 100 parts by weight of a monomeric mixture of essentially equal parts by weight of dry, inhibitor-free vinyl fluoride monomer and chlorotrifluoroethylene were copolymerized as described in Example 1, utilizes a polymerization temperature of about 30° C. The recovered polymeric products were each fine white powders having a melting point of from about 100° C. to 130° C. These polymeric materials did not discolor or otherwise decompose when subjected to temperatures up to about 190° C., for a period of about 90 minutes and were each capable of forming exceptionally tough film materials having excellent clarity.

Example 4

In each of a series of experiments 100 parts by weight of dry, inhibitor-free vinylidene fluoride monomer were polymerized as described in Example 1, utilizing a catalyst mixture composed of titanium tetrachloride in amount sufficient to provide from about 200 to 300 p.p.m.

titanium based on the weight of monomer, triethyl aluminum in amount sufficient to provide from about 6 to 10 moles of triethyl aluminum per mole of titanium tetrachloride, and tetrahydrofuran in amount sufficient to provide from about 5 to 15 moles of tetrahydrofuran per mole of triethyl aluminum, while utilizing a polymerization temperature of about 25° C. and a reaction time of about 18 hours. The recovered polymeric materials were each fine white crystalline powders having a melting point of from about 160° C. to 170° C.

What is claimed is:

1. In the method of polymerizing monomers selected from the group consisting of vinyl fluoride, vinylidene fluoride, chlorotrifluoroethylene and mixtures thereof the improvement consisting of:
   (I) contacting said monomers in the absence of solvents or diluents at a temperature between about 25° C. and 60° C. while under autogeneous pressure, with a catalytic mixture formed by reacting (1) titanium tetrachloride, (2) triethyl aluminum, and (3) tetrahydrofuran, wherein the metal constituent of (1) is present in amounts of between about 200 and 300 p.p.m. based on the weight of the monomers, wherein (2) is present in amounts between about 1 and 10 moles per mole of (1); wherein (3) is present in amounts between about 1 and 20 moles per mole of (1); said catalytic mixture being formed by admixture of (2) and (3) followed by the addition of (1); and
   (II) recovering the polymer.

2. The process of claim 1 wherein said monomer is vinyl fluoride and wherein (2) is present in amounts between about 1 and 5 moles per mole of (1) and wherein (3) is present in amounts between about 10 and 20 moles per mole of (1).

3. The process of claim 2 wherein said monomer is chlorotrifluoroethylene.

4. The process of claim 2 wherein said monomer is a mixture of vinyl fluoride and chlorotrifluoroethylene.

5. The process of claim 1 wherein said monomer is vinylidene fluoride and wherein (2) is present in amounts between about 6 and 10 moles per mole of (1) and wherein (3) is present in amounts between about 5 and 15 moles per mole of (1).

6. The process of claim 1 wherein said monomer is a mixture of vinylidene fluoride and chlorotrifluoroethylene and wherein (2) is present in amounts between about 1 and 3 moles per mole of (1) and wherein (3) is present in amounts between about 5 and 15 moles per mole of (1).

References Cited

UNITED STATES PATENTS 3,089,866   5/1963   Crawford _____ 260—87.7 XR

FOREIGN PATENTS 834,937   5/1960   Great Britain.

JOSEPH L. SCHOFER, *Primary Examiner.*

M. L. BERCH, R. S. BENJAMIN, *Assistant Examiners.*